US012793999B2

(12) United States Patent
Lee et al.

(10) Patent No.: US 12,793,999 B2
(45) Date of Patent: Nov. 10, 2026

(54) FUEL CELL-BASED MULTIPLE POWER SUPPLY SYSTEM

(71) Applicant: FCI CO., LTD., Daejeon (KR)

(72) Inventors: Tae Won Lee, Goyang-si (KR); Bo Hyun Ryu, Daejeon (KR); In Gab Chang, Daejeon (KR)

(73) Assignee: FCI CO., LTD., Daejeon (KR)

(*) Notice: Subject to any disclaimer, the term of this patent is extended or adjusted under 35 U.S.C. 154(b) by 707 days.

(21) Appl. No.: 18/266,136

(22) PCT Filed: Nov. 29, 2021

(86) PCT No.: PCT/KR2021/017694
§ 371 (c)(1),
(2) Date: Jun. 8, 2023

(87) PCT Pub. No.: WO2022/124661
PCT Pub. Date: Jun. 16, 2022

(65) Prior Publication Data

US 2024/0047717 A1 Feb. 8, 2024

(30) Foreign Application Priority Data

Dec. 11, 2020 (KR) ........................ 10-2020-0173228

(51) Int. Cl.
*H01M 8/2495* (2016.01)
*H01M 8/04537* (2016.01)
(Continued)

(52) U.S. Cl.
CPC ..... *H01M 8/2495* (2013.01); *H01M 8/04619* (2013.01); *H01M 8/0494* (2013.01);
(Continued)

(58) Field of Classification Search
CPC .................. H01M 16/003–006; H02J 2101/30
See application file for complete search history.

(56) References Cited

U.S. PATENT DOCUMENTS 10,529,999 B2 1/2020 Suzuki
2005/0048334 A1* 3/2005 Sridhar .................... C25B 9/19 429/465
(Continued)

FOREIGN PATENT DOCUMENTS

CN 204020886 U 12/2014
CN 108069036 A 5/2018
(Continued)

OTHER PUBLICATIONS

International Search Report for PCT/KR2021/017694 dated Mar. 16, 2022.

*Primary Examiner* — Rexford N Barnie
*Assistant Examiner* — David A Shiao
(74) *Attorney, Agent, or Firm* — Sughrue Mion, PLLC

(57) ABSTRACT

Disclosed is a fuel cell-based multiple power supply system, and more particularly a fuel cell-based multiple power supply system capable of alternately operating a polymer electrolyte membrane fuel cell that is rapidly started up and provides fast response and a solid oxide fuel cell that provides high power generation efficiency depending on required situations and remedying some power deficiency using an energy storage system or a secondary battery, such as a super capacitor, thereby flexibly dealing with a situation difficult to solve using a single fuel cell.

6 Claims, 6 Drawing Sheets

(51) Int. Cl.

| | |
|---|---|
| ***H01M 8/04858*** | (2016.01) |
| ***H01M 8/04955*** | (2016.01) |
| ***H01M 16/00*** | (2006.01) |
| *H01M 8/10* | (2016.01) |
| *H01M 8/12* | (2016.01) |
| *H02J 101/30* | (2026.01) |

(52) U.S. Cl.

CPC ... *H01M 8/04947* (2013.01); *H01M 8/04955* (2013.01); *H01M 16/006* (2013.01); *H01M 2008/1095* (2013.01); *H01M 2008/1293* (2013.01); *H01M 2250/20* (2013.01); *H02J 2101/30* (2026.01); *Y02E 60/50* (2013.01); *Y02T 90/40* (2013.01)

(56) References Cited

U.S. PATENT DOCUMENTS

| | | | | |
|---|---|---|---|---|
| 2006/0222912 | A1* | 10/2006 | Smith | H01M 8/186 429/417 |
| 2006/0228593 | A1 | 10/2006 | Grieve et al. | |
| 2012/0267952 | A1* | 10/2012 | Ballatine | H02J 3/381 307/26 |
| 2013/0187448 | A1* | 7/2013 | Loison | B64D 25/00 307/9.1 |
| 2013/0293175 | A1* | 11/2013 | King | H01M 8/04619 318/500 |
| 2015/0228992 | A1* | 8/2015 | Jung | H01M 8/0687 429/410 |
| 2017/0005357 | A1* | 1/2017 | Mermelstein | H01M 8/186 |
| 2017/0346116 | A1* | 11/2017 | Suzuki | H01M 16/003 |
| 2018/0134401 | A1* | 5/2018 | Halsey | B64D 35/022 |
| 2018/0141674 | A1* | 5/2018 | Bailey | H01M 8/04201 |
| 2018/0254498 | A1* | 9/2018 | Patel | H01M 8/0656 |
| 2023/0070193 | A1* | 3/2023 | Zaag | B60L 50/72 |

FOREIGN PATENT DOCUMENTS

| | | | |
|---|---|---|---|
| JP | 2006-528416 | A | 12/2006 |
| JP | 2018-116834 | A | 7/2018 |
| JP | 2019-29051 | A | 2/2019 |
| KR | 10-2007-0038515 | A | 4/2007 |
| KR | 10-2009-0019466 | A | 2/2009 |
| KR | 10-2011-0064723 | A | 6/2011 |
| KR | 10-2012-0010662 | A | 2/2012 |
| KR | 10-2017-0015815 | A | 2/2017 |
| KR | 10-2019-0076665 | A | 7/2019 |
| KR | 10-2117630 | B1 | 6/2020 |
| WO | 2016/063517 | A1 | 4/2016 |

* cited by examiner

FUEL CELL-BASED MULTIPLE POWER SUPPLY SYSTEM

This Application is a National Stage of International Application No. PCT/KR2021/017694 filed Nov. 29, 2021, claiming priority based on Korean Patent Application No. 10-2020-0173228 filed Dec. 11, 2020.

BACKGROUND OF THE INVENTION

Field of the Invention

The present disclosure relates to a fuel cell-based multiple power supply system, and more particularly to a fuel cell-based multiple power supply system capable of alternately operating a polymer electrolyte membrane fuel cell that is rapidly started up and provides fast response and a solid oxide fuel cell that provides high power generation efficiency depending on required situations and remedying some power deficiency using an energy storage system or a secondary battery, such as a super capacitor, thereby flexibly dealing with a situation difficult to solve using a single fuel cell.

Description of the Related Art

As global warming attracted attention as an international issue in the early 2000s, the International Maritime Organization (IMO) has set an energy efficiency design index (EEDI) in order to reduce carbon dioxide discharged from ships and has tightened regulations such that the EEDI is satisfied in a ship design step. According to the regulations, ships constructed since 2013 must satisfy the EEDI. In addition, the International Maritime Organization has promoted a plan to reduce the amount of greenhouse gases discharged from ships by 40% by 2030 and by 50% by 2050.

One of the best methods of reducing discharge of carbon dioxide from ships is using hydrogen or ammonia, from which carbon dioxide is not fundamentally discharged, as a fuel. If ammonia is used as a fuel, however, toxic gas is generated, and therefore it is impossible to use ammonia as a fuel by ship classification regulations.

A fuel cell using hydrogen as a fuel is a kind of power generator that converts chemical energy generated through chemical reaction of the fuel into electric energy. No explosion process is performed, whereby there is less vibration of the fuel cell. In addition, the energy conversion step is simple, whereby power generation efficiency is relatively high. Furthermore, few contaminants are discharged. For these reasons, the fuel cell is in the spotlight as a next-generation energy supply means for ships.

The solid oxide fuel cell exhibits high flexibility as a fuel and is capable of performing high-efficiency power generation. However, quite a bit of time is taken to start up and stop the fuel cell. In addition, when grid demand is variable, rapid output response is difficult.

When the ship is moved in a voyage period, therefore, the solid oxide fuel cell may be appropriately used. However, when it is necessary to dynamically move the ship, for example when the ship departs from a port or when the ship comes into a port, explosive output is required within a short time or required output excessively fluctuates. As a result, there occur problems difficult to be solved using only the solid oxide fuel cell.

SUMMARY OF THE INVENTION

The present disclosure has been made in view of the above problems, and it is an object of the present disclosure to provide energy supply technology capable of simultaneously satisfying a situation in which it is necessary to operate a load having great output fluctuation within a short time and a situation in which power generation efficiency is considered first of all.

It is another object of the present disclosure to provide complementary energy supply technology capable of preparing for an urgent situation that may occur while the energy supply technology is used.

In accordance with the present disclosure, the above and other objects can be accomplished by the provision of a fuel cell-based multiple power supply system including a polymer electrolyte membrane fuel cell (PEMFC), a solid oxide fuel cell (SOFC), and an operating control system configured to operate the PEMFC and operate a load using electricity produced by the PEMFC in a first operating period and to stop operation of the PEMFC and operate the load using electricity produced by the SOFC in a second operating period.

The PEMFC may receive hydrogen stored in a hydrogen tank as a fuel, and the SOFC may receive hydrogen obtained as the result of reforming any one of liquefied petroleum gas, liquefied natural gas, and methane gas as a fuel.

The SOFC may include a plurality of unit cell modules, the SOFC may be operated in any one of a fuel cell mode in which all of the unit cell modules are used as a fuel cell and a dual mode in which some of the unit cell modules are used as a fuel cell and some other of the unit cell modules are used as a solid oxide electrolyzer cell, and the operating control system may operate the SOFC in the fuel cell mode in the first operating period.

The operating control system may operate the SOFC in the dual mode and may fill the hydrogen tank with hydrogen produced by the SOFC in a third operating period.

Electricity stored in an energy storage system (ESS) or a super capacitor may be input to the unit cell modules operated as the solid oxide electrolyzer cell in the dual mode.

The operating control system may operate the load using both electricity produced by the PEMFC and electricity stored in the energy storage system (ESS) in the first operating period.

The SOFC may be operated in any one of the fuel cell mode and a solid oxide electrolyzer cell mode, and the operating control system may operate the SOFC in the fuel cell mode in the first operating period.

The operating control system may operate the SOFC in the solid oxide electrolyzer cell mode and may fill the hydrogen tank with hydrogen produced by the SOFC in the third operating period.

The operating control system may operate the load using electricity stored in the energy storage system (ESS) in the third operating period.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
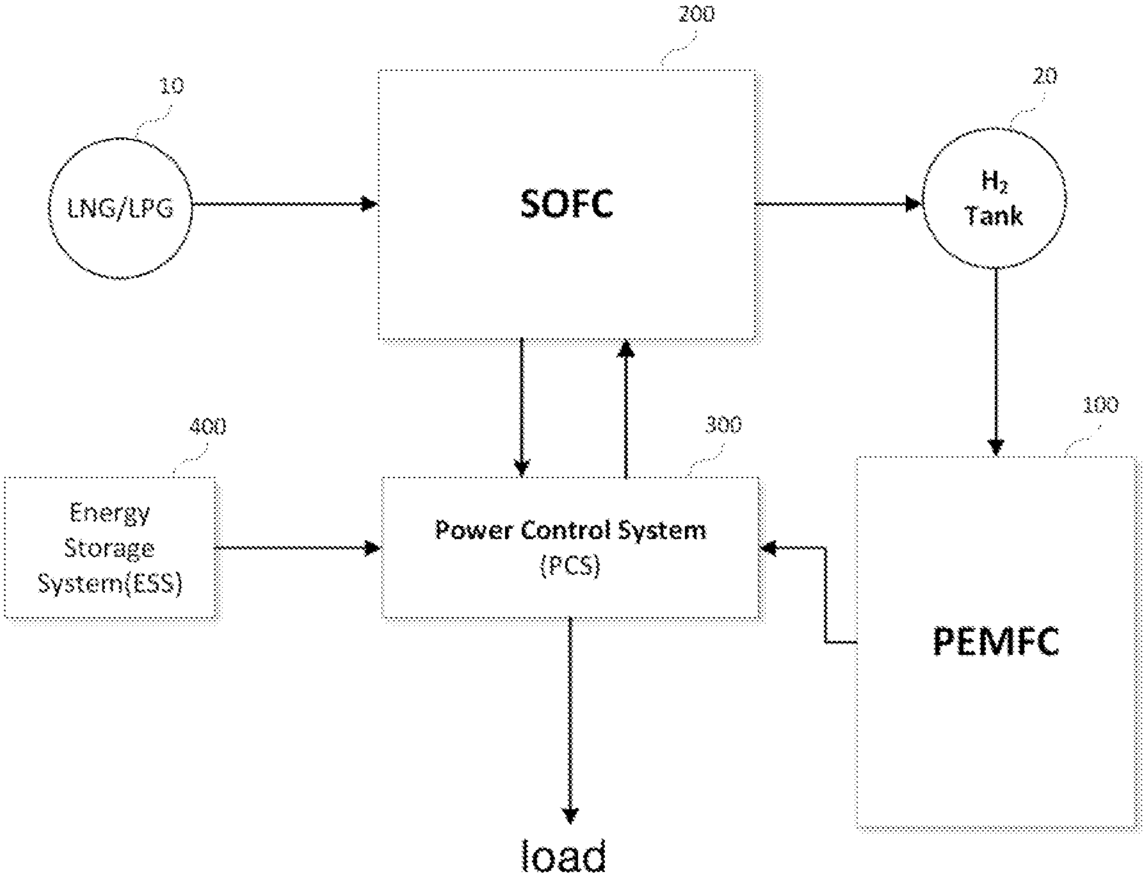
FIG. 1 is a view showing the construction of a multiple power supply system according to an embodiment of the present disclosure.

Hereinafter, the present disclosure will be described in detail with reference to the accompanying drawings.

Embodiments of the present disclosure relate to a multiple power supply system including both a polymer electrolyte membrane fuel cell (PEMFC) and a solid oxide fuel cell (SOFC).

The polymer electrolyte membrane fuel cell has relatively short start-up time and fast response time to output change of a load. However, a catalyst and an electrolyte used in the polymer electrolyte membrane fuel cell are expensive, and activation of the polymer electrolyte membrane fuel cell may be deteriorated due to CO contained in hydrogen during long-term operation thereof. In addition, operating temperature of the polymer electrolyte membrane fuel cell is relatively low, whereby it is not possible to utilize waste heat.

The solid oxide fuel cell has the highest power generation efficiency among existing fuel cells, and a catalyst and an electrolyte used in the solid oxide fuel cell are inexpensive. In addition, hydrocarbon may be directly used as a fuel for the solid oxide fuel cell, whereby the solid oxide fuel cell is safe from CO. Furthermore, the solid oxide fuel cell is operated at a high temperature of about 600 to 1000° C., whereby it is possible to utilize waste heat. However, it is not possible to obtain sufficient output from the solid oxide fuel cell when operating temperature of the solid oxide fuel cell is low. In addition, start-up time of the solid oxide fuel cell is long until the temperature of the solid oxide fuel cell reaches an appropriate operating time, and it is not possible for the solid oxide fuel cell to rapidly respond to request of a load.

As described above, the polymer electrolyte membrane fuel cell and the solid oxide fuel cell have conflicting advantages and disadvantages. When the polymer electrolyte membrane fuel cell and the solid oxide fuel cell are used in a hybrid mode, therefore, it is possible to respond to a plurality of loads having different requirements and to smoothly deal with different situation-based operating conditions even though a single load is provided.

In the following description, the case in which the multiple power supply system according to the present disclosure is installed in a ship configured to be operated by an electric propulsion motor will be described by way of example for ease of understanding. However, it is obvious to a person having ordinary skill in the art to which the present disclosure pertains that the multiple power supply system according to the present disclosure is applicable to various technical fields, apparatuses or systems having similar operating environments to the ship, in addition to the ship.

First Embodiment

A first embodiment of the present disclosure relates to technology for selectively connecting a polymer electrolyte membrane fuel cell and a solid oxide fuel cell to a load depending on operating characteristics of the load. In the first embodiment of the present disclosure, a single module type solid oxide fuel cell is used, and the solid oxide fuel cell is operated only as a power generator.

FIG. 1 is a view showing the construction of a multiple power supply system according to a first embodiment of the present disclosure.

As shown in FIG. 1, the multiple power supply system according to the first embodiment of the present disclosure includes a polymer electrolyte membrane fuel cell (hereinafter referred to as a "PEMFC") 100, a solid oxide fuel cell (hereinafter referred to as an "SOFC") 200, a power control system (hereinafter referred to as a "PCS") 300, and an operating control system (not shown). The multiple power supply system according to the first embodiment of the present disclosure may further include an energy storage system (hereinafter referred to as an "ESS") 400.

The PEMFC 100 is a fuel cell using a polymer membrane as an electrolyte. The PEMFC 100 includes electrodes each including a catalyst and an electrolyte membrane. Hydrogen supplied to an anode (fuel electrode) is divided into hydrogen ions and electrons. The hydrogen ions move to a cathode (air electrode), which is an electrode opposite the anode, through the electrolyte membrane, and the electrons move along a conducting wire, whereby current flows, and therefore electricity is produced.

The SOFC 200 is a fuel cell using an ion-conductive ceramic as an electrolyte. The SOFC 200 includes an ion-conductive electrolyte and a cathode and an anode located on opposite surfaces of the ion-conductive electrolyte. When air and hydrogen are supplied respectively to the cathode and the anode, oxygen reduction reaction occurs at the cathode, whereby oxygen ions are generated. The oxygen ions move to the anode through the electrolyte, and react with the hydrogen supplied to the anode, whereby water is generated. At this time, electrons are generated at the anode, and electrons are consumed at the cathode. When both electrodes are connected to each other, therefore, current flows, whereby electricity is produced. The SOFC 200 may directly use pure hydrogen as a fuel, or may use hydrogen obtained as the result of reforming a hydrocarbon fuel, such as liquefied natural gas (LNG), liquefied petroleum gas (LPG), or methane gas, as a fuel.

The PCS 300 is located between a power supply side and a load side to match power characteristics thereof. In the multiple power supply system according to the first embodiment of the present disclosure, the PCS 300 converts power characteristics of the PEMFC, the SOFC, the ESS, and a super capacitor, which performs the function of a power supply, so as to match requirements of a load or a grid connected to the multiple power supply system.

On the assumption that a DC motor is used as an example of a load and the DC motor is operated by at least one of the PEMFC, the SOFC, and the ESS, the PCS 300 serves as a DC-DC converter or a DC-AC-DC converter. In addition, when electricity produced by the SOFC is supplied to the grid, the PCS 300 serves as a DC-AC converter or a grid-connected inverter.

The operating control system (not shown) controls the operation of components constituting the multiple power supply system according to the first embodiment of the present disclosure, such as the PEMFC 100, the SOFC 200, the PCS 300, the ESS 400, and control valves (not shown) connected to a fuel tank 10 configured to store a fuel, such as LPG or LNG, and a hydrogen tank 20.

Specifically, in a first operating period, the operating control system operates the PEMFC 100, and operates a load using electricity produced by the PEMFC 100. In a second operating period, the operating control system stops the operation of the PEMFC 100, and operates the load using electricity produced by the SOFC 200.

When electricity produced by the PEMFC 100 is not sufficient to operate the load in the first operating period, the operating control system may further use electricity output from the ESS 400 in order to operate the load.

Hereinafter, the operation of the multiple power supply system according to the first embodiment of the present disclosure when the multiple power supply system is installed in a ship will be described in detail.

The first operating period may be understood as a departure step in which the ship departs from a port or an arrival step in which the ship comes into a port. The second operating period corresponds to a voyage step. In addition, the load may be a propulsion motor configured to propel the ship.

In the departure step, which is the first operating period, it is necessary for the propulsion motor, which is connected to a shaft of a propeller, to provide high output within a short time in order to move the heavy ship, which is at a standstill, at the time of departure. In addition, rotation of the propulsion motor is frequently switched between forward rotation and reverse rotation while precise steering is performed in order to escape the port, which has a limited space.

In the arrival step, which is the first operating period, it is necessary to rapidly rotate the propeller in a reverse direction in order to decelerate the ship, which advances by inertia, thereby preventing the ship from colliding with port facilities, at the time of arrival. At this time, it is necessary for the propulsion motor, which is connected to the shaft of the propeller, to provide high output within a short time. In addition, rotation of the propulsion motor is frequently switched between forward rotation and reverse rotation while precise steering is performed in order to come into a port, which has a limited space.

In the departure step or the arrival step, the operating control system turns on the PEMFC 100 and operates the propulsion motor using electricity produced by the PEMFC 100 in order to match output characteristics of the propulsion motor. At this time, the PEMFC 100 receives hydrogen stored in the high-pressure hydrogen tank 20 in order to produce electricity.

On the other hand, in the voyage step, which is the second operating period, the ship continues to cruise without abrupt change in speed, and therefore it is not necessary to abruptly change the output of the propulsion motor. Instead, power generation efficiency becomes more important in order to efficiently use the fuel, the quantity of which is limited. Consequently, the operating control system turns off the PEMFC 100 and operates the propulsion motor using electricity produced by the SOFC 200.

For reference, when the ship is moored at a port, the SOFC 200 may be in a standstill state, may be operated in a hot standby state while consuming only the minimum amount of the fuel after being turned on at a certain point in time before, or may be operated in an operating state in which rated power is produced. Electricity produced by the SOFC 200 in the operating state may be supplied to various kinds of electric equipment in the ship, may be connected to the grid so as to be sold, may be stored in the ESS 400 disposed in the ship, or may be stored in a separate ESS (not shown) disposed outside the ship.

In other words, when departure of the ship is decided during moorage of the ship and the first operating mode is commenced, the SOFC 200 is turned on from the standstill state, is maintained in the hot standby state, is switched from the hot standby state to the operating state, or continues to be operated in the operating state. Subsequently, when the second operating mode is commenced, the SOFC 200 produces electricity and supplies the produced electricity to the propulsion motor in order to propel the ship while being operated in the operating state.

In the multiple power supply system for ships, it is preferable for the SOFC 200 to receive hydrogen obtained as the result of reforming a hydrocarbon fuel loaded in the ship as a cargo, such as liquefied natural gas (LNG), liquefied petroleum gas (LPG), or methane gas, as a fuel. However, the present disclosure is not limited thereto, and the SOFC 200 may receive hydrogen stored in the high-pressure hydrogen tank 20 as a fuel.

A scenario for operating the multiple power supply system for ships according to the first embodiment of the present disclosure will be described with reference to FIG. 2.

Figure 2:
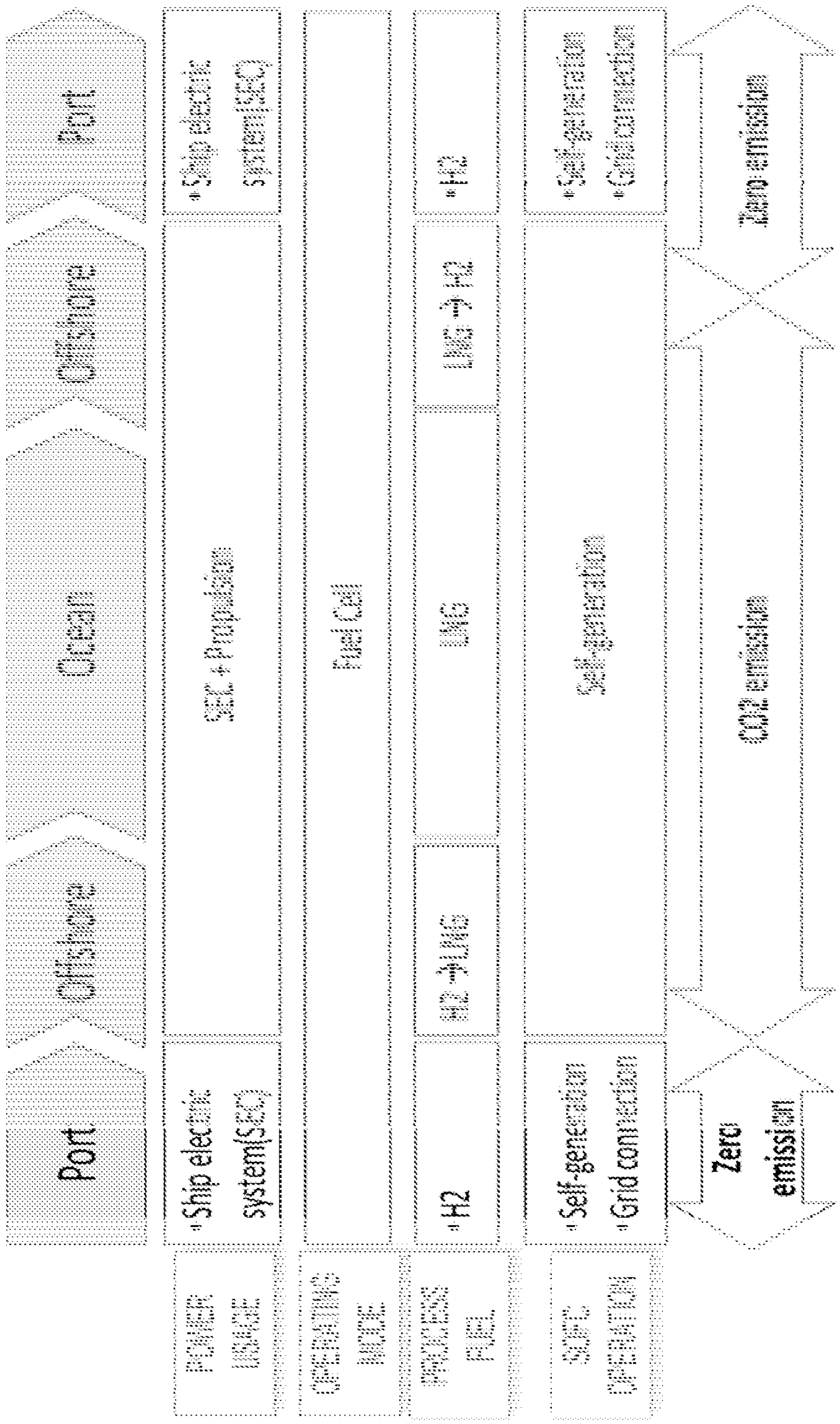
FIG. 2 is a flowchart illustrating the operation of the multiple power supply system for ships according to the embodiment of the present disclosure of FIG. 1, analyzed from various points of view.

FIG. 2 is a flowchart illustrating the operation of the multiple power supply system for ships according to the first embodiment of the present disclosure, analyzed from various points of view.

From the point of view of power usage, the multiple power supply system is operated as a ship electric system (SEC) configured to supply power to various kinds of electric equipment in the ship in the moorage step (PORT), and is operated as propulsion for advancing the ship as well as the ship electric system in the departure step (OFFSHORE), the voyage step (OCEAN), or the arrival step (OFFSHORE). After arrival at the port, the multiple power supply system is operated again as the ship electric system in the moorage step (PORT).

From the point of view of operating mode, the SOFC 200 of the multiple power supply system according to the first embodiment of the present disclosure has only a fuel cell mode, and therefore the SOFC 200 is operated as a fuel cell in all of the departure step, the voyage step, and the arrival step.

From the point of view of fuel that is used, the multiple power supply system is operated as the ship electric system in the moorage step (PORT), and therefore hydrogen stored in the hydrogen tank 20 in the ship or hydrogen stored in a hydrogen tank (not shown) located at the port is used. In the departure step (OFFSHORE), the PEMFC operates the propulsion motor, and therefore hydrogen stored in the hydrogen tank 20 in the ship is used. In the voyage step (OCEAN), the SOFC operates the propulsion motor, and therefore hydrocarbon loaded in the ship, such as LNG, LPG, or methane, is used. In the arrival step (OFFSHORE), the PEMFC operates the propulsion motor, and therefore hydrogen stored in the hydrogen tank 20 in the ship is used, in the same manner as in the departure step.

From the point of view of SOFC operation, the SOFC 200 may be operated in any one of the standstill state (OFF), the hot standby state, and the operating state in the moorage step (PORT). However, it is preferable for the SOFC 200 to be operated in the operating state since electricity must be supplied to the electric equipment in the ship even during moorage of the ship. At this time, electricity produced by the SOFC 200 in the operating state may be stored in the ESS 400 disposed in the ship or an ESS (not shown) located at the port (SELF-GENERATION), or may be connected to a grid so as to be sold (GRID CONNECTION). In the departure step (OFFSHORE) or the voyage step (OCEAN), the SOFC 200 is operated only as a power generator in order to operate the propulsion motor and to supply electricity to the electric equipment in the ship (SELF-GENERATION).

Second Embodiment

In a second embodiment of the present disclosure, a PEMFC and an SOFC are selectively connected to a load depending on operating characteristics of the load, and a single module type SOFC system is operated as any one of an SOFC and a solid oxide electrolyzer cell (hereinafter referred to as an "SOE") depending on circumstances.

Figure 3:
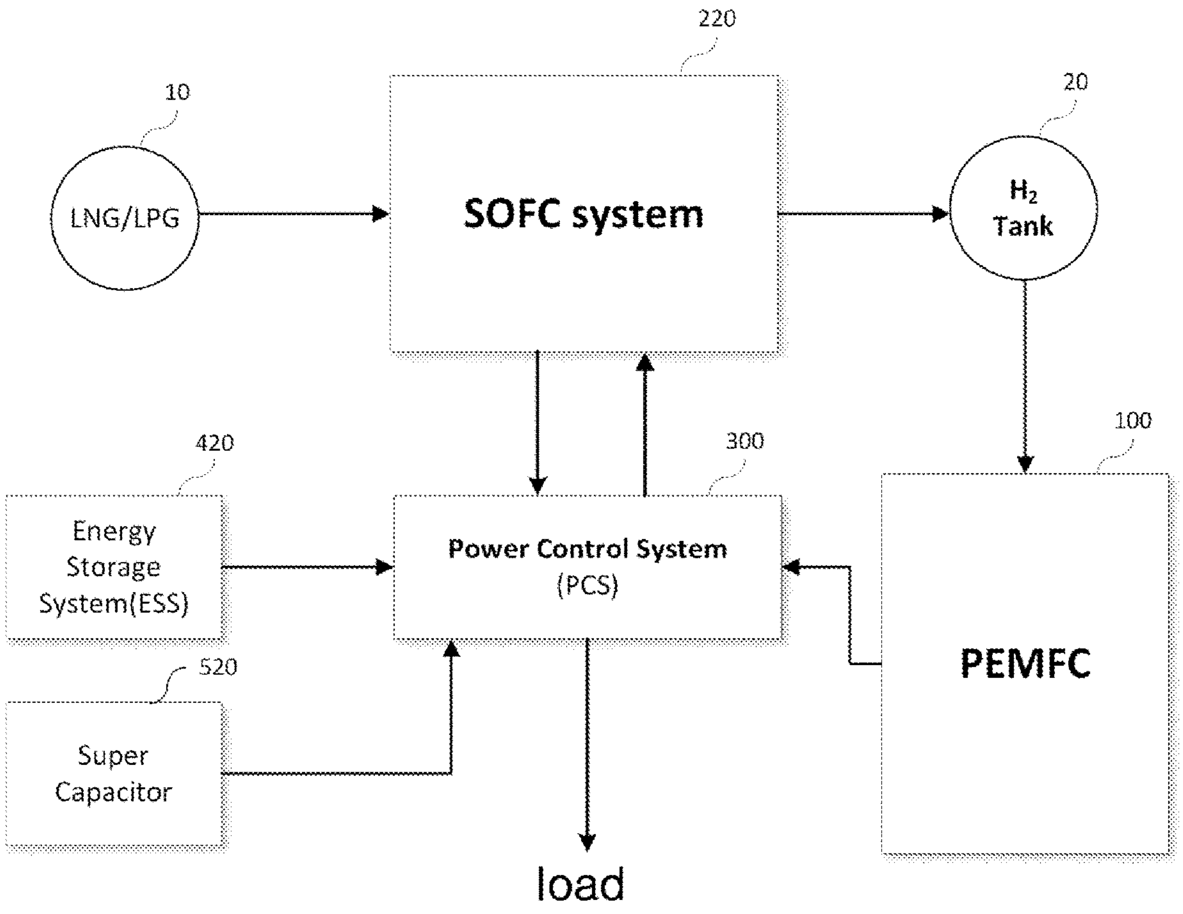
FIG. 3 is a view showing the construction of a multiple power supply system according to another embodiment of the present disclosure.

FIG. 3 is a view showing the construction of a multiple power supply system according to a second embodiment of the present disclosure.

As shown in FIG. 3, the multiple power supply system according to the second embodiment of the present disclosure includes a PEMFC 100, an SOFC system 220, a PCS 300, and an operating control system (not shown). The multiple power supply system according to the second embodiment of the present disclosure may further include an ESS 420 and a super capacitor 520.

The PEMFC 100 and the PCS 300 of the multiple power supply system according to the second embodiment of the present disclosure are identical in construction to the PEMFC 100 and the PCS 300 of the multiple power supply system according to the first embodiment of the present disclosure, and therefore a duplicate description thereof will be omitted.

The SOFC system 220 is operated as an SOFC or an SOE under control of the operating control system. That is, the SOFC system 220 is operated in any one of a fuel cell mode and a solid oxide electrolyzer cell mode.

The operation of the SOFC system 220 as an SOFC in the fuel cell mode is identical to the operation of the SOFC 200 of the multiple power supply system according to the first embodiment of the present disclosure, and therefore a duplicate description thereof will be omitted.

The operation of the SOFC system 220 as an SOE in the solid oxide electrolyzer cell mode is reverse to the operation of the SOFC. When water vapor is introduced into a cathode and electricity is applied to an anode, an electrical potential difference occurs between the cathode and the anode, whereby each water molecule at the cathode is divided into hydrogen and oxygen. Subsequently, hydrogen is diffused to the surface of the cathode, and oxygen ions move to the anode through an electrolyte. After movement, the oxygen ions are oxidized into oxygen, and the oxygen is discharged through the anode.

When hydrogen is injected into the SOFC system 220 while the SOFC system 220 is operated as an SOFC, therefore, electricity is produced. When electricity is applied to the SOFC system 220 while the SOFC system 220 is operated as an SOE, on the other hand, hydrogen is produced.

The operating control system (not shown) controls the operation of components constituting the multiple power supply system according to the second embodiment of the present disclosure, such as the PEMFC 100, the SOFC system 220, the PCS 300, the ESS 420, the super capacitor 520, and control valves (not shown) connected to a fuel tank 10 configured to store a fuel, such as LPG or LNG, and a hydrogen tank 20.

Specifically, in a first operating period, the operating control system operates the PEMFC 100, and operates a load using electricity produced by the PEMFC 100. In the first operating period, the SOFC system 220 may be operated in any one of the fuel cell mode and the solid oxide electrolyzer cell mode. When electricity produced by the PEMFC 100 is not sufficient to operate the load in the first operating period, the operating control system may further use electricity output from the ESS 420 in order to operate the load.

In a second operating period, the operating control system stops the operation of the PEMFC 100, and operates the SOFC system 220 in the fuel cell mode. In addition, the operating control system operates the load using electricity produced by the SOFC system 220.

In a third operating period, the operating control system operates the SOFC system 220 in the solid oxide electrolyzer cell mode, and fills the hydrogen tank 20 with hydrogen produced by the SOFC system 220. In the third operating period, the operating control system may operate the load using electricity output from the ESS 420 or may supply electricity for operating the solid oxide electrolyzer cell to the SOFC system 220 while the SOFC system 220 is operated in the solid oxide electrolyzer cell mode. In addition, the operating control system may supply electricity stored in the super capacitor 520 to the SOFC system 220 in order to operate the solid oxide electrolyzer cell.

Hereinafter, the operation of the multiple power supply system according to the second embodiment of the present disclosure when the multiple power supply system is installed in a ship will be described in detail.

The first operating period corresponds to a departure step in which the ship departs from a port or an arrival step in which the ship comes into a port. The second operating period corresponds to a voyage step. The third operating period corresponds to an arrival step. In addition, the load corresponds to a propulsion motor configured to propel the ship.

In the departure step or the arrival step, which is the first operating period, the operating control system turns on the PEMFC 100 and operates the propulsion motor using electricity produced by the PEMFC 100, for the same reason as in the first embodiment of the present disclosure. At this time, the PEMFC 100 receives hydrogen stored in the high-pressure hydrogen tank 20 in order to produce electricity. In the departure step or the arrival step, the operating control system may operate the SOFC system 220 in the solid oxide electrolyzer cell mode or the fuel cell mode.

In the voyage step, which is the second operating period, the operating control system turns off the PEMFC 100 and operates the propulsion motor using electricity produced by the SOFC system 220 in the fuel cell mode, for the same reason as in the first embodiment of the present disclosure.

The third operating period may be defined as an arrival step. However, the arrival step does not necessarily indicate only a step immediately before arrival at the port despite the name thereof. That is, the arrival step includes both the case in which movement of the ship is temporarily stopped at sea for any reason irrespective of the distance from the port and the case in which the ship is slowly moved at low output using the ESS.

In the arrival step, which is the third operating period, the operating control system switches the mode of the SOFC system 220 from the fuel cell mode to the solid oxide electrolyzer cell mode, and fills the hydrogen tank 20 with hydrogen produced by the SOFC system 220 in the solid oxide electrolyzer cell mode.

In the arrival step, the operating control system may operate the propulsion motor using electricity output from the ESS 420 and may supply electricity stored in the super capacitor 520 to the SOFC system 220 in order to operate the solid oxide electrolyzer cell while the SOFC system 220 is operated in the solid oxide electrolyzer cell mode.

If it is not necessary to move the ship while the SOFC system 220 is operated in the solid oxide electrolyzer cell mode, the operating control system supplies electricity stored in the ESS 420 to the SOFC system 220 in order to operate the solid oxide electrolyzer cell.

For reference, when the ship is moored at a port, the SOFC system 220 may be in a standstill state, may be operated in a hot standby state while consuming only the minimum amount of the fuel, or may be operated in an operating state in which rated power is produced in the fuel cell mode.

When departure of the ship is decided during moorage of the ship and the first operating mode is commenced, therefore, the SOFC system 220 is turned on from the standstill state, is maintained in the hot standby state, is switched from the hot standby state to the operating state, or continues to be operated in the operating state. Subsequently, when the second operating mode is commenced, the SOFC system 220 produces electricity and supplies the produced electricity to the propulsion motor in order to propel the ship while being operated in the operating state.

As another example, when the ship is moored at a port, the SOFC system 220 may be in a standstill state, may be operated in a hot standby state while consuming only the minimum amount of the fuel, or may be operated in an operating state in which hydrogen is produced in the solid oxide electrolyzer cell mode. Hydrogen produced by the SOFC system 220 in the operating state may be stored in the hydrogen tank in the ship or may be stored in a separate hydrogen station (not shown) located outside the ship.

When departure of the ship is decided during moorage of the ship and the first operating mode is commenced, the SOFC system 220 is turned on from the standstill state, is maintained in the hot standby state, is switched from the hot standby state to the operating state, or continues to be operated in the operating state. Subsequently, when the second operating mode is commenced, the SOFC system 220 produces electricity and supplies the produced electricity to the propulsion motor in order to propel the ship while being operated in the operating state.

Meanwhile, in the multiple power supply system for ships according to the second embodiment of the present disclosure, it is preferable for the SOFC system 220 to receive hydrogen obtained as the result of reforming a hydrocarbon fuel loaded in the ship as a cargo, such as liquefied natural gas (LNG), liquefied petroleum gas (LPG), or methane gas, as a fuel, in the same manner as in the first embodiment of the present disclosure. However, the present disclosure is not limited thereto, and the SOFC system 220 may receive hydrogen stored in the high-pressure hydrogen tank 20 as a fuel.

A scenario for operating the multiple power supply system for ships according to the second embodiment of the present disclosure will be described with reference to FIG. 4.

Figure 4:
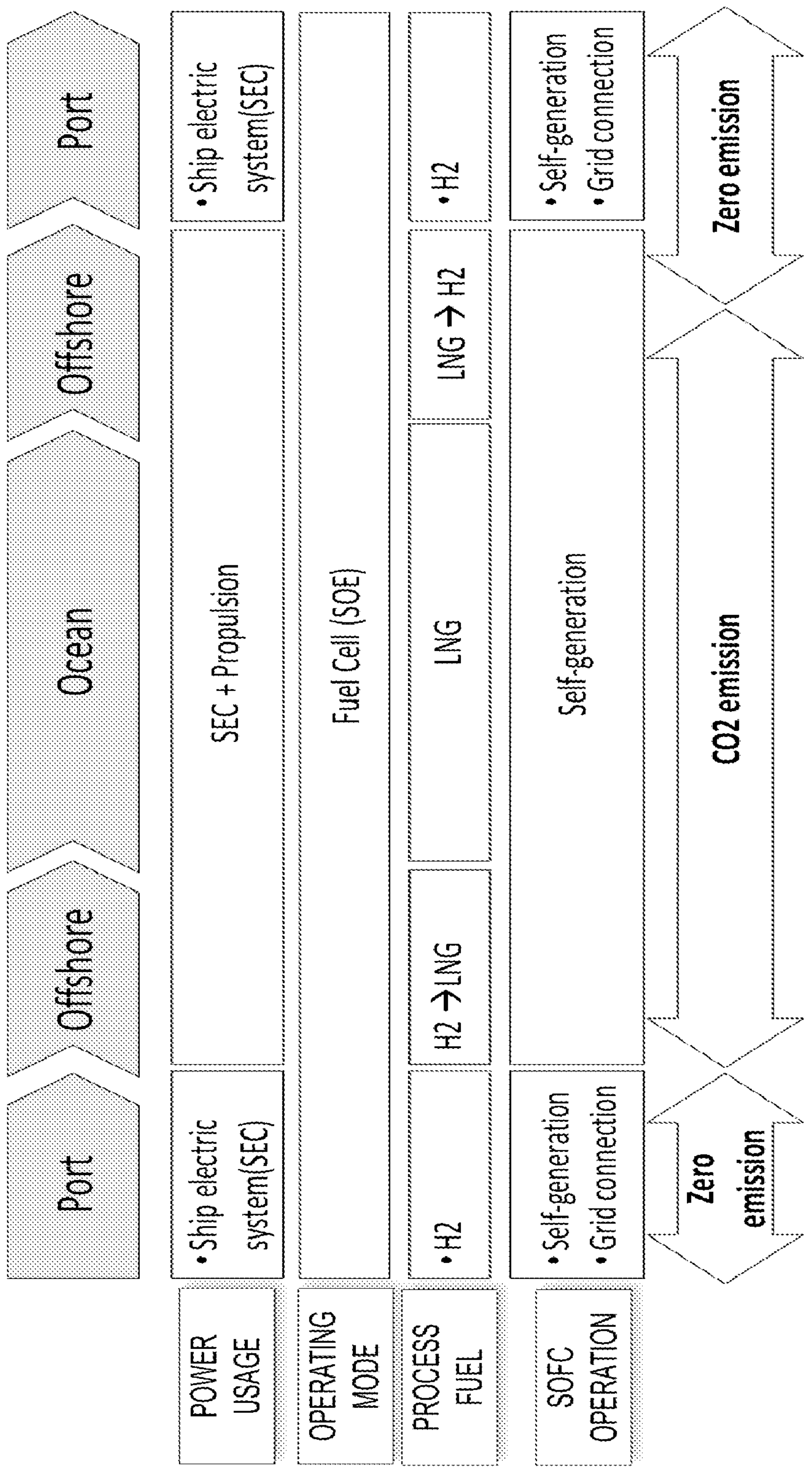
FIG. 4 is a flowchart illustrating the operation of the multiple power supply system for ships according to the embodiment of the present disclosure of FIG. 3, analyzed from various points of view.

FIG. 4 is a flowchart illustrating the operation of the multiple power supply system for ships according to the second embodiment of the present disclosure, analyzed from various points of view.

From the point of view of power usage, the multiple power supply system is operated as a ship electric system (SEC) configured to supply power to various kinds of electric equipment in the ship in the moorage step (PORT), and is operated as propulsion for advancing the ship as well as the ship electric system in the departure step (OFFSHORE), the voyage step (OCEAN), or the arrival step (OFFSHORE). After arrival at the port, the multiple power supply system is operated again as the ship electric system in the moorage step (PORT).

From the point of view of operating mode, the SOFC system 220 is basically operated as an SOFC in all steps. However, the SOFC system 220 may be temporarily operated as an SOE in a situation in which it is difficult to specify the point in time, such as the case in which movement of the ship is temporarily stopped at sea for any reason irrespective of the distance from the port or the case in which the ship is slowly moved at low output using the ESS.

From the point of view of fuel that is used, the multiple power supply system is operated as the ship electric system in the moorage step (PORT), and therefore hydrogen stored in the hydrogen tank 20 in the ship or hydrogen stored in a hydrogen tank (not shown) located at the port is used. In the departure step (OFFSHORE), the PEMFC operates the propulsion motor, and therefore hydrogen stored in the hydrogen tank 20 in the ship is used. In the voyage step (OCEAN), the SOFC operates the propulsion motor, and therefore hydrocarbon loaded in the ship, such as LNG, LPG, or methane, is used. In the arrival step (OFFSHORE), the PEMFC operates the propulsion motor, and therefore hydrogen stored in the hydrogen tank 20 in the ship is used, in the same manner as in the departure step.

From the point of view of SOFC operation, the SOFC may be operated in any one of the standstill state (OFF), the hot standby state, and the operating state in the moorage step (PORT). However, it is preferable for the SOFC to be operated in the operating state since electricity must be supplied to the electric equipment in the ship even during moorage of the ship. At this time, electricity produced by the SOFC in the operating state may be stored in the ESS 400 disposed in the ship or an ESS (not shown) located at the port (SELF-GENERATION), or may be connected to a grid so as to be sold (GRID CONNECTION). In the departure step (OFFSHORE) or the voyage step (OCEAN), the SOFC is operated only as a power generator in order to operate the propulsion motor and to supply electricity to the electric equipment in the ship (SELF-GENERATION).

Third Embodiment

In a third embodiment of the present disclosure, a PEMFC and an SOFC are selectively connected to a load depending on operating characteristics of the load, and an SOFC system including a plurality of unit cell modules is operated as any one of an SOFC, an SOE, and an SOFC+an SOE depending on circumstances.

Figure 5:
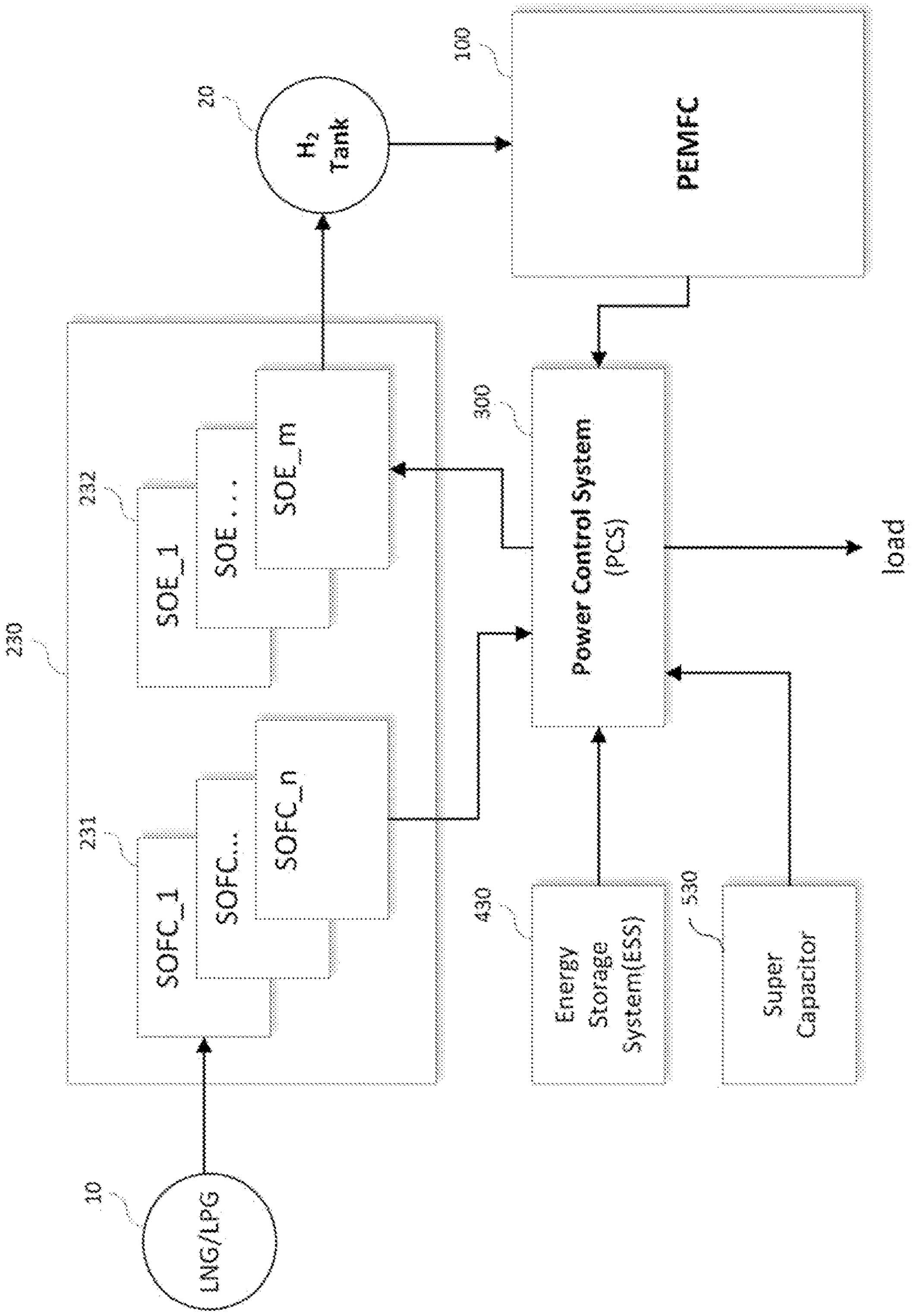
FIG. 5 is a view showing the construction of a multiple power supply system according to a further embodiment of the present disclosure.

FIG. 5 is a view showing the construction of a multiple power supply system according to a third embodiment of the present disclosure.

As shown in FIG. 5, the multiple power supply system according to the third embodiment of the present disclosure includes a PEMFC 100, an SOFC system 230, a PCS 300, and an operating control system (not shown). The multiple power supply system according to the third embodiment of the present disclosure may further include an ESS 430 and a super capacitor 530.

The PEMFC 100 and the PCS 300 of the multiple power supply system according to the third embodiment of the present disclosure are identical in construction to the PEMFC 100 and the PCS 300 of the multiple power supply system according to the first embodiment of the present disclosure, and therefore a duplicate description thereof will be omitted.

In the third embodiment of the present disclosure, the SOFC system 230 includes a plurality of unit cell modules. Each of the unit cell modules is controlled by a variable control module (not shown) of the SOFC system 230 under control of the operating control system. Some unit cell modules 231 may be operated as an SOFC and some other unit cell modules 232 may be operated as an SOE in accordance with mode control of the variable control module. In addition, two or more unit cell modules may be connected to each other in series, in parallel, or in series and in parallel in accordance with connection control of the variable control module.

Consequently, the entirety of the SOFC system 230 may be operated as an SOFC, an SOE, or both an SOFC and an SOE under control of the variable control module. That is, the SOFC system 230 is operated in any one of a fuel cell mode, a solid oxide electrolyzer cell mode, and a dual mode. In addition, output of the SOFC and the SOE may be variably adjusted depending on series and parallel connection of the unit cell modules.

The operation of the SOFC system 230 as an SOFC in the fuel cell mode and the solid oxide electrolyzer cell mode is identical to the operation of the SOFC 200 of the multiple power supply system according to the first embodiment of the present disclosure and the operation of the SOFC system 220 of the multiple power supply system according to the second embodiment of the present disclosure, and therefore a duplicate description thereof will be omitted.

The operating control system (not shown) controls the operation of components constituting the multiple power supply system according to the third embodiment of the present disclosure, such as the PEMFC 100, the SOFC system 230, the PCS 300, the ESS 430, the super capacitor 530, and control valves (not shown) connected to a fuel tank 10 configured to store a fuel, such as LPG or LNG, and a hydrogen tank 20.

Specifically, in a first operating period, the operating control system operates the PEMFC 100, and operates a load using electricity produced by the PEMFC 100. In the first operating period, the SOFC system 230 may be operated in any one of the fuel cell mode, the solid oxide electrolyzer cell mode, and the dual mode. When electricity produced by the PEMFC 100 is not sufficient to operate the load in the first operating period, the operating control system may further use electricity output from the ESS 430 in order to operate the load.

In a second operating period, the operating control system stops the operation of the PEMFC 100, and operates the SOFC system 230 in the fuel cell mode. In addition, the operating control system operates the load using electricity produced by the SOFC system 230.

In a third operating period, the operating control system operates the SOFC system 230 in the dual mode. The operating control system operates the load using electricity produced by some unit cell modules of the SOFC system 230, and fills the hydrogen tank 20 with hydrogen produced by some other unit cell modules of the SOFC system 230. The operating control system may supply electricity stored in the ESS 430 or the super capacitor 530 to the SOFC system 220 in order to operate the solid oxide electrolyzer cell.

Hereinafter, the operation of the multiple power supply system according to the third embodiment of the present disclosure when the multiple power supply system is installed in a ship will be described in detail.

The first operating period corresponds to a departure step in which the ship departs from a port or an arrival step in which the ship comes into a port. The second operating period corresponds to a voyage step. The third operating period corresponds to an arrival step. In addition, the load corresponds to a propulsion motor configured to propel the ship.

In the departure step or the arrival step, which is the first operating period, the operating control system turns on the PEMFC 100 and operates the propulsion motor using electricity produced by the PEMFC 100, for the same reason as in the first embodiment of the present disclosure. At this time, the PEMFC 100 receives hydrogen stored in the high-pressure hydrogen tank 20 in order to produce electricity. In the departure step or the arrival step, the operating control system may operate the SOFC system 230 in any one of the fuel cell mode, the solid oxide electrolyzer cell mode, and the dual mode.

In the voyage step, which is the second operating period, the operating control system turns off the PEMFC 100 and operates the propulsion motor using electricity produced by the SOFC system 230 in the fuel cell mode, for the same reason as in the first embodiment of the present disclosure.

In the arrival step, which is the third operating period, the operating control system sets or changes the mode of the SOFC system 230 to the dual mode, operates the load using electricity produced by some unit cell modules, and fills the hydrogen tank 20 with hydrogen produced by some other unit cell modules.

For reference, when the ship is moored at a port, the SOFC system 230 may be in a standstill state, may be operated in a hot standby state while consuming only the minimum amount of the fuel, or may be operated in an operating state in which rated power is produced in the fuel cell mode.

When departure of the ship is decided during moorage of the ship and the first operating mode is commenced, therefore, the SOFC system 230 is turned on from the standstill state, is maintained in the hot standby state, is switched from the hot standby state to the operating state, or continues to be operated in the operating state. Subsequently, when the second operating mode is commenced, the SOFC system 230 produces electricity and supplies the produced electricity to the propulsion motor in order to propel the ship while being operated in the operating state.

As another example, when the ship is moored at a port, the SOFC system 230 may be in a standstill state, may be operated in a hot standby state while consuming only the minimum amount of the fuel, or may be operated in an operating state in which hydrogen is produced in the solid oxide electrolyzer cell mode. Hydrogen produced by the SOFC system 230 in the operating state may be stored in the hydrogen tank in the ship or may be stored in a separate hydrogen station (not shown) located outside the ship.

When departure of the ship is decided during moorage of the ship and the first operating mode is commenced, the SOFC system 230 is turned on from the standstill state, is maintained in the hot standby state, is switched from the hot standby state to the operating state, or continues to be operated in the operating state. Subsequently, when the second operating mode is commenced, the SOFC system 230 produces electricity and supplies the produced electricity to the propulsion motor in order to propel the ship while being operated in the operating state.

As a further example, when the ship is moored at a port, the SOFC system 230 may be in a standstill state, may be operated in a hot standby state while consuming only the minimum amount of the fuel, or may be operated in an operating state in which electricity and hydrogen are produced in the dual mode.

When departure of the ship is decided during moorage of the ship and the first operating mode is commenced, the SOFC system 230 is turned on from the standstill state, is maintained in the hot standby state, is switched from the hot standby state to the operating state, or continues to be operated in the operating state. Subsequently, when the second operating mode is commenced, the SOFC system 230 produces electricity and supplies the produced electricity to the propulsion motor in order to propel the ship while being operated in the operating state in the fuel cell mode.

Meanwhile, in the multiple power supply system for ships according to the third embodiment of the present disclosure, it is preferable for the SOFC system 230 to receive hydrogen obtained as the result of reforming a hydrocarbon fuel loaded in the ship as a cargo, such as liquefied natural gas (LNG), liquefied petroleum gas (LPG), or methane gas, as a fuel, in the same manner as in the first embodiment of the present disclosure. However, the present disclosure is not limited thereto, and the SOFC system 230 may receive hydrogen stored in the high-pressure hydrogen tank 20 as a fuel.

A scenario for operating the multiple power supply system for ships according to the third embodiment of the present disclosure will be described with reference to FIG. 6.

Figure 6:
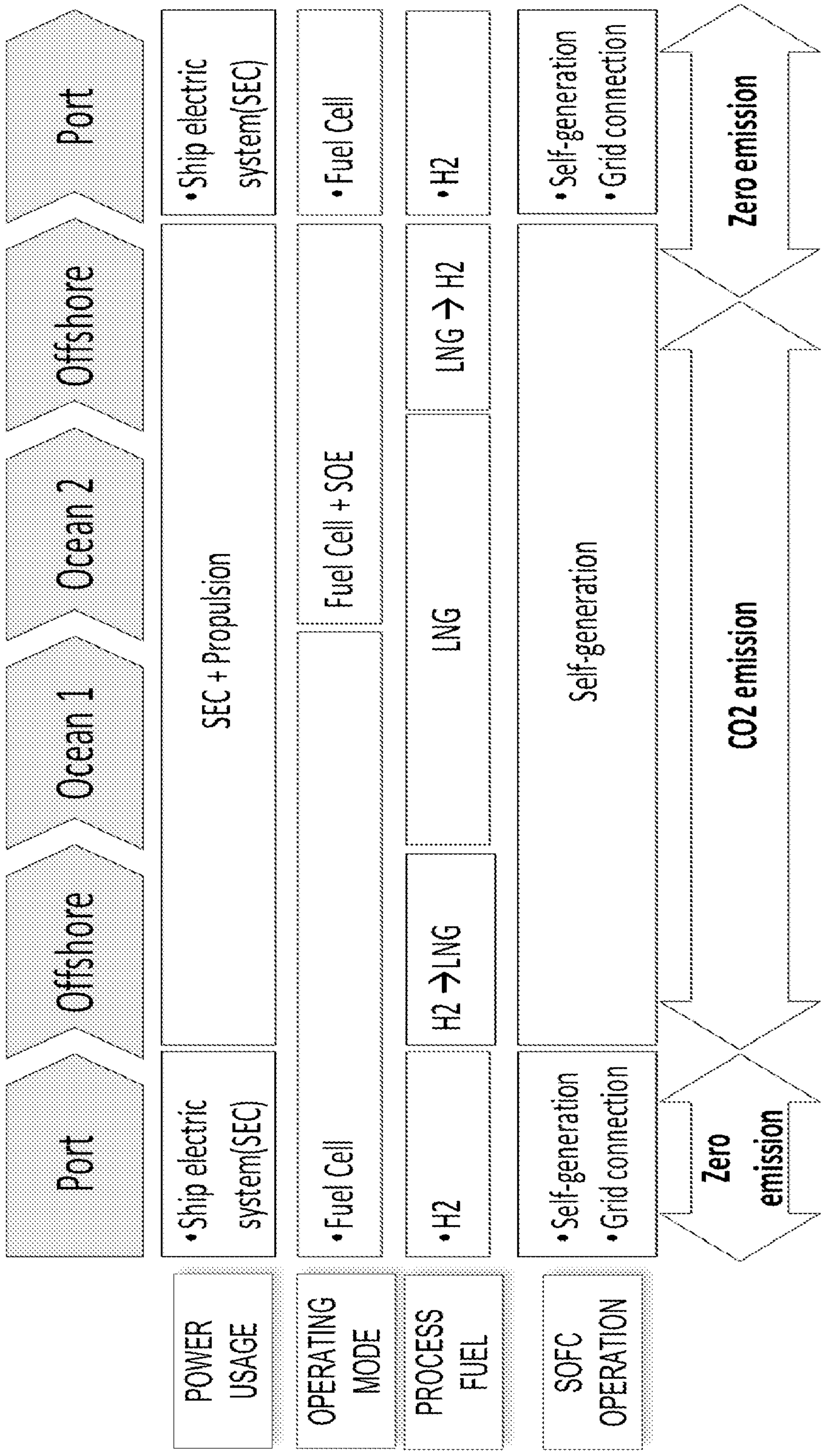
FIG. 6 is a flowchart illustrating the operation of the multiple power supply system for ships according to the embodiment of the present disclosure of FIG. 5, analyzed from various points of view.

FIG. 6 is a flowchart illustrating the operation of the multiple power supply system for ships according to the third embodiment of the present disclosure, analyzed from various points of view.

In FIG. 6, the voyage step is divided into two steps, unlike FIGS. 2 and 4. A first voyage step (OCEAN 1) is identical to the voyage step of FIGS. 2 and 4, and a second voyage step (OCEAN 2) indicates an arbitrary period in which the SOFC system 230 is operated in the solid oxide electrolyzer cell mode in FIG. 4.

Consequently, the second voyage step (OCEAN 2) is a period in which some unit cell modules of the SOFC system 230 are operated as an SOFC and some other unit cell modules of the SOFC system 230 are operated as an SOE at an arbitrary point in time, such as the case in which movement of the ship is temporarily stopped at sea for any reason irrespective of the distance from the port, the case in which the ship is slowly moved at low output using the ESS, or the case in which the ship is slowly moved at low output in preparation for arrival at the port.

From the point of view of power usage, the multiple power supply system is operated as a ship electric system (SEC) configured to supply power to various kinds of electric equipment in the ship in the moorage step (PORT), and is operated as propulsion for advancing the ship as well as the ship electric system in the departure step (OFFSHORE), the voyage step (OCEAN), or the arrival step (OFFSHORE). After arrival at the port, the multiple power supply system is operated again as the ship electric system in the moorage step (PORT). Unlike FIG. 4, however, some unit cell modules of the SOFC system 230 are operated as an SOE in the second voyage step (OCEAN 2) and the arrival step (OFFSHORE), and therefore propulsion by the SOFC may become lower than in the first voyage step (OCEAN 1).

From the point of view of operating mode, the SOFC system 230 is basically operated as an SOFC in all steps. However, some unit cell modules of the SOFC system 230 are operated as an SOFC and some other unit cell modules of the SOFC system 230 are operated as an SOE in the second voyage step (OCEAN 2) and/or the arrival step (OFFSHORE). The ratio of the unit cell modules operated as the SOFC to the unit cell modules operated as the SOE, among the plurality of unit cell modules, is set by the operating control system.

From the point of view of fuel that is used, the multiple power supply system is operated as the ship electric system in the moorage step (PORT), and therefore hydrogen stored in the hydrogen tank 20 in the ship or hydrogen stored in a hydrogen tank (not shown) located at the port is used. In the departure step (OFFSHORE), the PEMFC operates the propulsion motor, and therefore hydrogen stored in the hydrogen tank 20 in the ship is used. In the voyage step (OCEAN), the SOFC operates the propulsion motor, and therefore hydrocarbon loaded in the ship, such as LNG, LPG, or methane, is used. In the arrival step (OFFSHORE), the PEMFC operates the propulsion motor, and therefore hydrogen stored in the hydrogen tank 20 in the ship is used, in the same manner as in the departure step.

From the point of view of SOFC operation, the SOFC may be operated in any one of the standstill state (OFF), the hot standby state, and the operating state in the moorage step (PORT). However, it is preferable for the SOFC to be operated in the operating state since electricity must be supplied to the electric equipment in the ship even during moorage of the ship. At this time, electricity produced by the SOFC in the operating state may be stored in the ESS 400 disposed in the ship or an ESS (not shown) located at the port (SELF-GENERATION), or may be connected to a grid so as to be sold (GRID CONNECTION). In the departure step (OFFSHORE) or the voyage step (OCEAN), the SOFC is operated only as a power generator in order to operate the propulsion motor and to supply electricity to the electric equipment in the ship (SELF-GENERATION).

As is apparent from the above description, an embodiment of the present disclosure has an effect in that it is possible to provide energy supply technology capable of simultaneously satisfying a situation in which it is necessary to operate a load having great output fluctuation within a short time and a situation in which power generation efficiency is considered first of all.

In addition, an embodiment of the present disclosure has an effect in that it is possible to provide complementary energy supply technology capable of preparing for an urgent situation that may occur while the energy supply technology is used.

It should be noted that the effects of the present disclosure are not limited to the effects mentioned above, and other unmentioned effects will be clearly understood by those skilled in the art from the above description.

Since the embodiments of the present disclosure described above are merely provided for structural or functional description of the present disclosure, it should not be interpreted that the scope of rights of the present disclosure is limited by the embodiments described in this specification. That is, since embodiments may be variously changed and may have various forms, and therefore it should be understood that the scope of rights of the present disclosure includes equivalents capable of implementing technical ideas of the present disclosure. In addition, this does not mean that a specific embodiment must include all of the objects and effects of the present disclosure or the specific embodiment must include only the effects of the present disclosure.

Meanings of the terms used in the present application must be interpreted as follows. That is, the terms "first" and "second" are used to distinguish one element from another element, and the scope of rights of the present disclosure is not limited by the terms.

It should be understood that, when one element is referred to as being "connected to" another element, the one element may be directly connected to the other element, or intervening elements may be present. In contrast, it should be understood that, when one element is referred to as being "directly connected to" another element, there are no intervening elements present. In addition, other terms that describe the relationship between elements, such as "between" and "directly between" or "adjacent to" and "directly adjacent to", must be interpreted in the same manner.

A singular representation may include a plural representation unless it represents a definitely different meaning from the context. It should be further understood that the terms "comprises" and "has" specify the presence of implemented features, numbers, steps, operations, elements, parts, and combinations thereof but do not preclude the presence or addition of one or more other features, numbers, steps, operations, elements, parts, and combinations thereof.

Reference symbols, such as a, b, and c, in steps are used for convenience of description, and the reference symbols do not describe the order of the steps. The steps may be performed differently from the specified order unless clearly described in context. That is, the steps may be performed in the specified order, may be substantially simultaneously performed, or may be performed in the reverse order.

The embodiments described in this specification and the accompanying drawings merely describe some of the technical ideas included in the present disclosure by way of example. Consequently, the embodiments disclosed in this specification are not provided to limit the technical ideas of the present disclosure but to describe the technical ideas of the present disclosure, and therefore the scope of the technical ideas of the present disclosure is not limited by the embodiments. It should be interpreted that all modifications and concrete embodiments that can be easily inferred by those skilled in the art within the scope of the technical ideas of the present disclosure included in the specification and the drawings of the present disclosure are included in the scope of rights of the present disclosure.

What is claimed is:

1. A fuel cell-based multiple power supply system comprising:

a polymer electrolyte membrane fuel cell (PEMFC);

a solid oxide fuel cell (SOFC), wherein the SOFC comprises a plurality of unit cell modules, and the SOFC is selectively operated in any one of a fuel cell mode in which all of the plurality of unit cell modules are used as a fuel cell and a dual mode in which some of the plurality of unit cell modules are used as a fuel cell and some other of the plurality of unit cell modules are used as a solid oxide electrolyzer cell; and an operating control system configured to operate the PEMFC and operate a load using electricity produced by the PEMFC in a first operating period and to stop operation of the PEMFC and operate the load using electricity produced by the SOFC in a second operating period.

2. The fuel cell-based multiple power supply system according to claim 1, wherein the operating control system operates the SOFC in the fuel cell mode in the first operating period.

3. The fuel cell-based multiple power supply system according to claim 2, wherein the operating control system operates the SOFC in the dual mode and fills a hydrogen tank with hydrogen produced by the SOFC in a third operating period.

4. The fuel cell-based multiple power supply system according to claim 3, wherein electricity stored in an energy storage system (ESS) is input to the plurality of unit cell modules operated as the solid oxide electrolyzer cell in the dual mode.

5. The fuel cell-based multiple power supply system according to claim 3, wherein electricity stored in a super capacitor is input to the plurality of unit cell modules operated as the solid oxide electrolyzer cell in the dual mode.

6. The fuel cell-based multiple power supply system according to claim 1, wherein the operating control system operates the load using both electricity produced by the PEMFC and electricity stored in an energy storage system (ESS) in the first operating period.

* * * * *